United States Patent

Hall et al.

[11] Patent Number: 5,529,114
[45] Date of Patent: Jun. 25, 1996

[54] ELECTRIC VEHICLE COOLANT PUMP ASSEMBLY

[75] Inventors: William B. Hall, Annapolis; David L. Schantz, Jr., Ellicott City; Marshall G. Jones, Joppa, all of Md.

[73] Assignee: Northrop Grumman Corporation, Linthicum, Md.

[21] Appl. No.: 258,296

[22] Filed: Jun. 10, 1994

[51] Int. Cl.⁶ .................................................. F28D 15/00
[52] U.S. Cl. ........................................ 165/41; 165/104.33
[58] Field of Search ................................. 417/326, 313; 165/41, 104.33

[56] References Cited

U.S. PATENT DOCUMENTS

| | | | |
|---|---|---|---|
| 5,052,472 | 10/1991 | Takahashi et al. | 165/104.33 X |
| 5,103,897 | 4/1992 | Cullimore | 165/41 X |
| 5,117,898 | 6/1992 | Light et al. | 165/41 X |
| 5,348,076 | 9/1994 | Asakawa | 165/104.33 X |
| 5,375,650 | 12/1994 | Mizuno | 165/104.33 X |

FOREIGN PATENT DOCUMENTS 55-119518  9/1980  Japan ..................... 165/41

Primary Examiner—Richard E. Gluck

[57] ABSTRACT

A coolant pump assembly for an electric vehicle includes a positive displacement pump having an inlet port, an outlet port, and a rotor, a variable-speed ac motor having a rotatable shaft mated with the rotor of the pump for rotating the rotor of the pump to circulate coolant through the inlet and outlet ports of the pump, and a motor control unit, communicating with a DC power source of the electric vehicle, for controlling the speed of the motor to provide a variable coolant flow through the electric vehicle.

11 Claims, 4 Drawing Sheets

ELECTRIC VEHICLE COOLANT PUMP ASSEMBLY

RELATED APPLICATIONS

The following identified U.S. patent applications are filed on the same date as the instant application and are relied upon and incorporated by reference in this application.

U.S. patent application entitled "Flat Topping Concept" bearing attorney docket No. 58,295, Ser. No. 08/258,295 and filed on the same date herewith;

U.S. patent application entitled "Electric Induction Motor And Related Method Of Cooling" bearing attorney docket No. 58,332, Ser. No. 08/259,150 and filed on the same date herewith;

U.S. patent application entitled "Automotive 12 Volt System For Electric Vehicles" bearing attorney docket No. 58,333, Ser. No. 08/258,142 and filed on the same date herewith;

U.S. patent application entitled "Direct Cooled Switching Module For Electric Vehicle Propulsion System" bearing attorney docket No. 58,334, Ser. No. 258,027 and filed on the same date herewith;

U.S. patent application entitled "Electric Vehicle Propulsion System" bearing attorney docket No. 58,335, Ser. No. 08/258,301 and filed on the same date herewith;

U.S. patent application entitled "Speed Control and Bootstrap Technique For High Voltage Motor Control" bearing attorney docket No. 58,336, Ser. No. 08/258,294 and filed on the same date herewith;

U.S. patent application entitled "Vector Control Board For An Electric Vehicle Propulsion System Motor Controller" bearing attorney docket No. 58,337, Ser. No. 08/258,306 and filed on the same date herewith;

U.S. patent application entitled "Digital Pulse Width Modulator With Integrated Test And Control" bearing attorney docket No. 58,338, Ser. No. 08/258,305 and filed on the same date herewith;

U.S. patent application entitled "Control Mechanism For Electric Vehicle" bearing attorney docket No. 58,339, Ser. No. 08/258,149 and filed on the same date herewith;

U.S. patent application entitled "Improved EMI Filter Topology for Power Inverters" bearing attorney docket No. 58,340, Ser. No. 08/258,153 and filed on the same date herewith;

U.S. patent application entitled "Fault Detection Circuit For Sensing Leakage Currents Between Power Source And Chassis" bearing attorney docket No. 58,341, Ser. No. 08/258,179 and filed on the same date herewith;

U.S. patent application entitled "Electric Vehicle Relay Assembly" bearing attorney docket No. 58,342, Ser. No. 08/258,117 and filed on the same date herewith;

U.S. patent application entitled "Three Phase Power Bridge Assembly" bearing attorney docket No. 58,343, Ser. No. 08/258,033 and filed on the same date herewith;

U.S. patent application entitled "Electric Vehicle Propulsion System Power Bridge With Built-In-Test" bearing attorney docket No. 58,344, Ser. No. 08/258,034 and filed on the same date herewith;

U.S. patent application entitled "Metod For Testing A Power Bridge For An Electric Vehicle Propulsion System" bearing attorney docket No. 58,345, Ser. No. 08/258,034 and filed on the same date herewith;

U.S. patent application entitled "Electric Vehicle Power Distribution Module" bearing attorney docket No. 58,346, Ser. No. 08/258,157 and filed on the same date herewith;

U.S. patent application entitled "Electric Vehicle Chassis Controller" bearing attorney docket No. 58,347, Ser. No. 08/258,628 and filed on the same date herewith;

U.S. patent application entitled "Electric Vehicle System Control Unit Housing" bearing attorney docket No. 58,348, Ser. No. 08/258,156 and filed on the same date herewith;

U.S. patent application entitled "Low Cost Fluid Cooled Housing For Electric Vehicle System Control Unit" bearing attorney docket No. 58,349, Ser. No. 08/258,299 and filed on the same date herewith;

U.S. patent application entitled "Heat Dissipating Transformer Coil" bearing attorney docket No. 58,351, Ser. No. 08/258,141 and filed on the same date herewith;

U.S. patent application entitled "Electric Vehicle Battery Charger" bearing attorney docket No. 58,352, Ser. No. 08/258,154 and filed on the same date herewith.

BACKGROUND OF THE INVENTION

Field of the Invention

This invention generally relates to pump assemblies, and particularly relates to pump assemblies for circulating coolant to cool heat-generating components of an electric vehicle. While the invention is subject to a wide range of applications, it is especially suited for use in electric vehicles that utilize batteries or a combination of batteries and other sources, e.g., a heat engine coupled to an alternator, as a source of power, and will be particularly described in that connection.

Discussion of the Related Art

Due to the importance currently placed on conserving petroleum reserves, achieving energy efficiency, and reducing air pollution, development of electric vehicles has become a priority. Ultimately, to be successful, these vehicles must be safe, inexpensive, efficient, and acceptable to consumers who are used to driving gasoline-powered vehicles.

For an electric vehicle to be commercially viable, its cost and performance should be competitive with that of its gasoline-powered counterparts. Typically, the vehicle's propulsion system and battery are the main factors that contribute to the vehicle's cost and performance competitiveness.

Generally, to achieve commercial acceptance, an electric vehicle propulsion system should provide the following features: (1) vehicle performance equivalent to typical gasoline-powered propulsion systems; (2) smooth control of vehicle propulsion; (3) regenerative braking; (4) high efficiency; (5) low cost; (6) self-cooling; (7) electromagnetic interference (EMI) containment; (8) fault detection and self-protection; (9) self-test and diagnostics capability; (10) control and status interfaces with external systems; (11) safe operation and maintenance; (12) flexible battery charging capability; and (13) auxiliary 12 volt power from the main battery. In prior practice, however, electric vehicle propulsion system design consisted largely of matching a motor and controller with a set of vehicle performance goals, such that performance was often sacrificed to permit a practical motor and controller design. Further, little attention was given to the foregoing features that enhance commercial acceptance.

For example, a typical conventional electric vehicle propulsion system consisted of several components, each having its own cooling system that used forced air or a combination of forced air and liquid cooling. Requiring separate cooling systems for each system component increased the complexity of electric vehicle design. The separate cooling systems also required power from the main power supply in order to operate, which decreased the power available to the electric motor and, as a result, hindered vehicle performance.

Additionally, conventional coolant systems used in other applications were unable to meet the special requirements for use in electric vehicles. In general, an electric vehicle coolant system should: (1) be powered by the main vehicle battery to avoid overloading the 12 volt system; (2) provide full performance over a widely varying terminal voltage, typically 230 to 400 VDC; (3) provide variable speed (flow) operation to conserve battery energy when full cooling capability is not needed; (4) provide a flow rate and pressure boost adequate for cooling electric motors used in the full-sized cars, typically 4 gpm and 60 psi; (5) have high efficiency for battery energy conservation and higher reliability with a useful life of approximately 10,000 hours; (6) be compact in size and lightweight; (7) have electrical isolation between its controller and power supply; and (8) provide self-protection from overloads. Conventional coolant systems, which typically use brushed DC motors and/or pumps with numerous moving parts, cannot meet these special requirements.

SUMMARY OF THE INVENTION

Accordingly, the present invention is directed to an electric vehicle coolant pump assembly that substantially obviates one or more of the problems due to the limitations and disadvantages of the related art.

Features and advantages of the invention will be set forth in the description which follows, and in part will be apparent from the description, or may be learned by practice of the invention. The objectives and other advantages of the invention will be realized and attained by the method and apparatus particularly pointed out in the written description and claims thereof as well as the appended drawings.

To achieve these and other advantages and in accordance with the purpose of the invention, as embodied and broadly described, the invention provides for a coolant pump assembly for an electric vehicle, comprising a positive displacement pump having an inlet port, an outlet port, and a rotor, a variable-speed ac motor having a rotatable shaft mated with the rotor of the pump for rotating the rotor of the pump to circulate coolant through the inlet and outlet ports of the pump, and control means, communicating with a DC power source of the electric vehicle, for controlling the speed of the motor to provide a variable coolant flow through the electric vehicle.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate a presently preferred embodiment of the invention and, together with the description, serve to explain the principles of the invention. In the drawings.

DETAILED DESCRIPTION

Reference will now be made in detail to a present preferred embodiment of the invention, an example of which is illustrated in the accompanying drawings.

Figure 1:
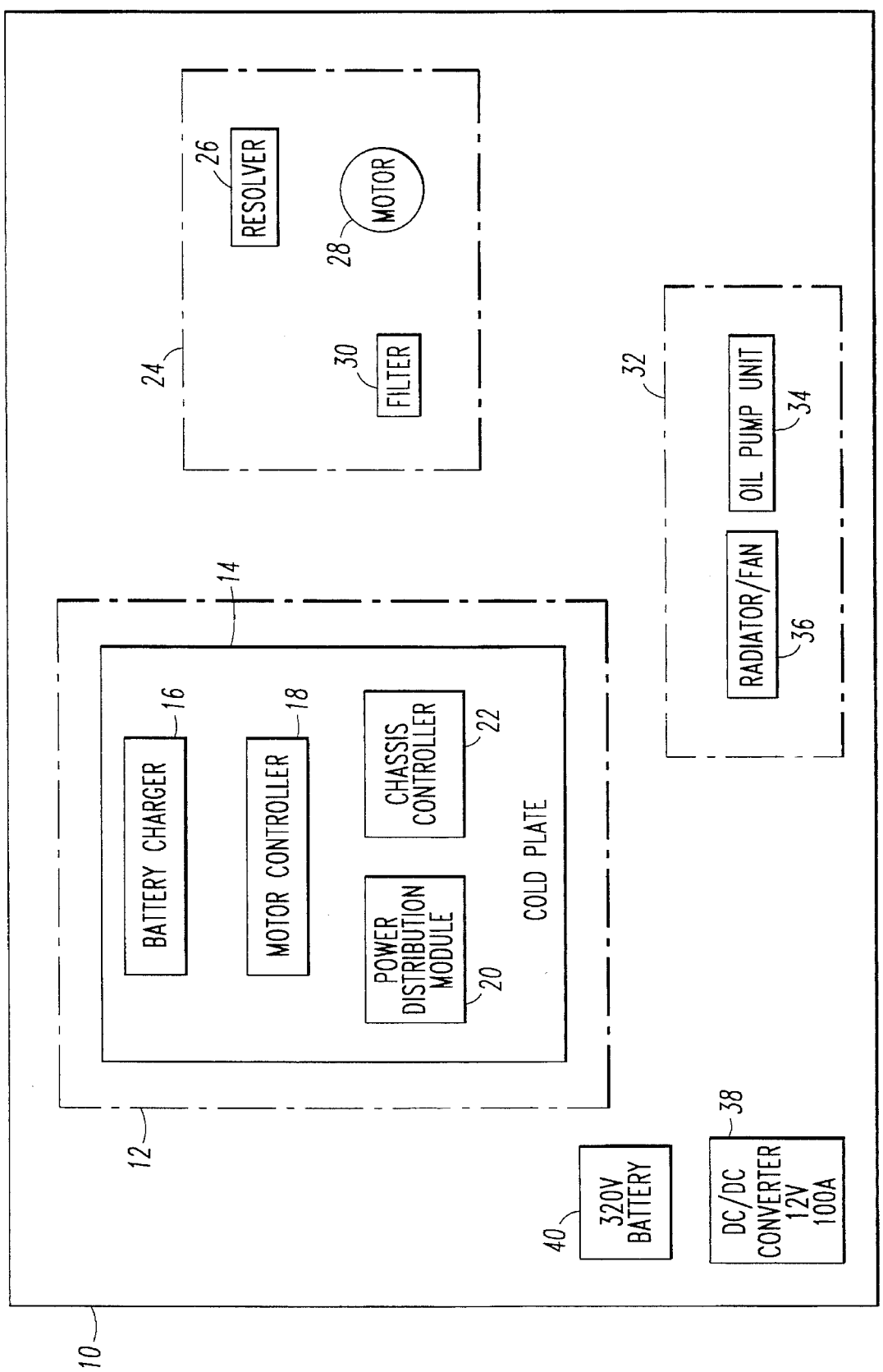
FIG. 1 is a block diagram of an electric vehicle propulsion system.

As shown in FIG. 1, there is provided an electric vehicle propulsion system 10, comprising a system control unit 12, a motor assembly 24, a cooling system 32, a battery 40, and a DC/DC converter 38. The system control unit 12 includes a cold plate 14, a battery charger 16, a motor controller 18, a power distribution module 20, and a chassis controller 22. The motor assembly 24 includes a resolver 26, a motor 28, and a filter 30. The cooling system 32 includes an oil pump unit and a radiator/fan 36.

Figure 2:
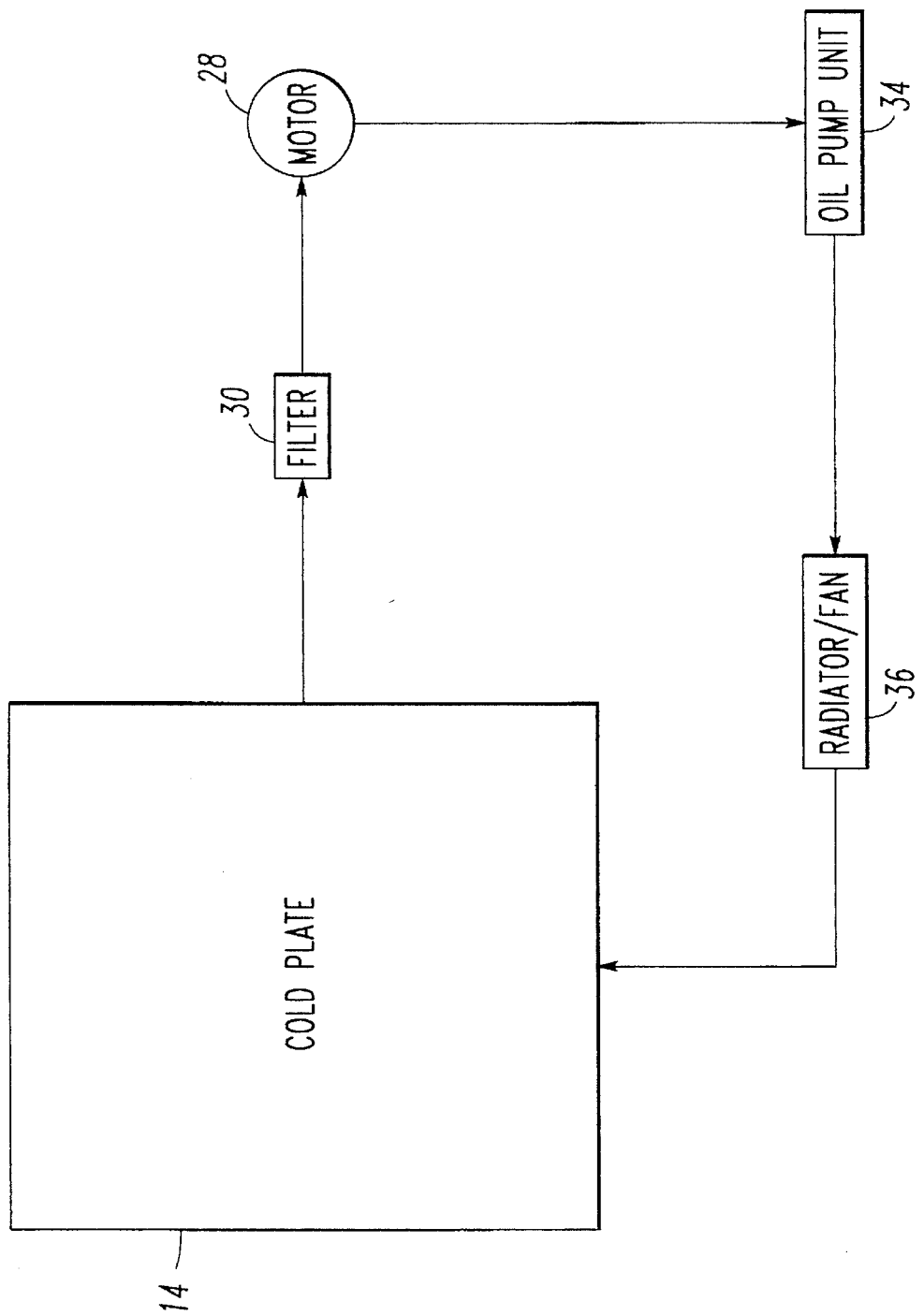
FIG. 2 is a schematic diagram of the cooling system of the electric vehicle propulsion system of FIG. 1.

As shown in FIG. 2, the electric vehicle propulsion system 10 utilizes a closed-loop cooling system including the cold plate 14, the filter 30, the motor 28, the oil pump unit 34, and the radiator/fan 36. Preferably, the cold plate 14 is a hollow body having a double-sided surface on which the battery charger 16, the motor controller 18, the power distribution module 20, and the chassis controller 22 are mounted in thermal contact. The oil pump unit 34 circulates coolant, e.g., aircraft turbine oil, from an oil reservoir of the motor 28 through the radiator/fan 36, the cold plate 14, the filter 30, and back through the motor 28 as shown in FIG. 2. Heat is removed from the oil by the radiator/fan 38 and the oil is filtered by the filter 30, which can comprise a commercially available oil filter known in the art. Preferably, the oil pump unit 34 is controlled by the motor controller 18 to provide a variable rate of oil flow.

It should be appreciated that the closed-loop oil cooling system of FIG. 2 protects the electric vehicle propulsion system 10 from the harsh automotive operating environment, thus increasing reliability and reducing maintenance. Further, because the same oil used for lubricating the motor 28 is also used for cooling the system control unit 12, the cooling system can have a simplified design.

Figure 3:
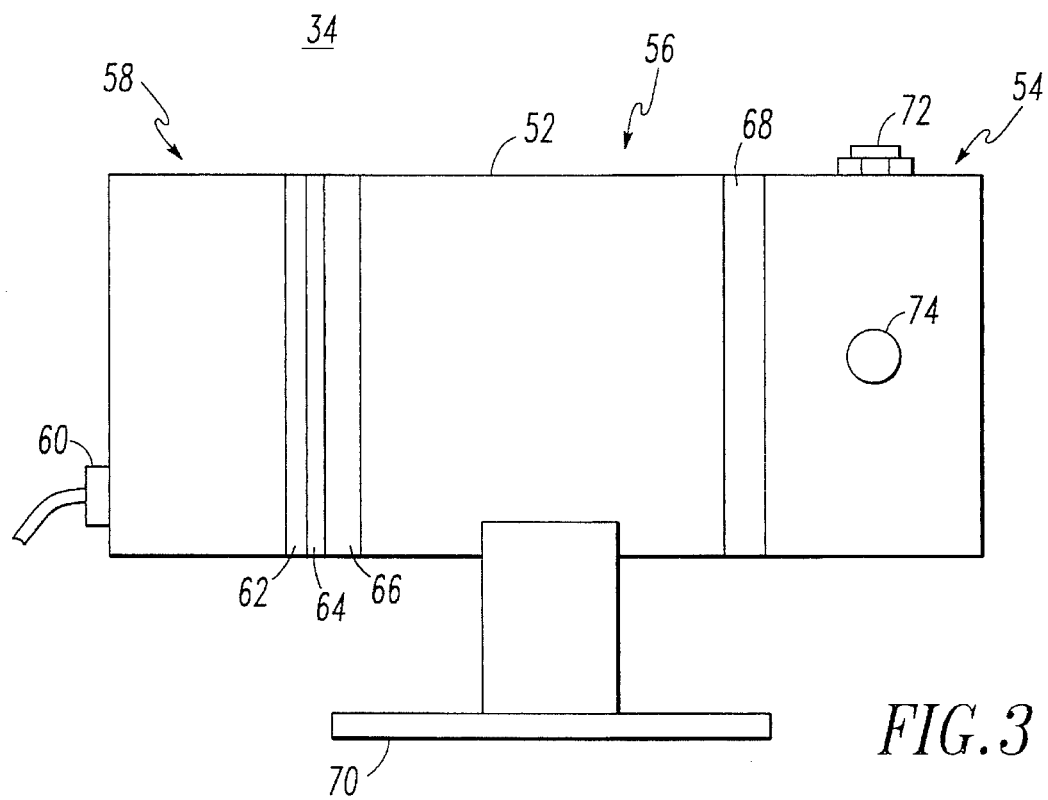
FIG. 3 is a side view of an oil pump unit in accordance with a preferred embodiment of the invention for use in the electric vehicle propulsion system of FIG. 1.

An exemplary embodiment of the oil pump unit of the present invention is shown in FIG. 3 and is designated generally by reference numeral 34. The oil pump unit includes a positive displacement type pump 54, a variable-speed ac motor 56 for driving the pump, and a motor control unit 58 for controlling the speed of the motor to provide a variable coolant flow through the electric vehicle.

As shown in FIG. 3, the oil pump unit 34 also includes a housing 52 that contains the pump 54, the motor 56, and the control unit 58. The motor control unit 58 is electrically connected to the main motor controller 18 via electrical connector 60. A mounting bracket 70 is attached to the housing 52 and allows the pump unit 34 to be mounted to a fender well, or other part of the frame, of the electric vehicle.

Figure 4:
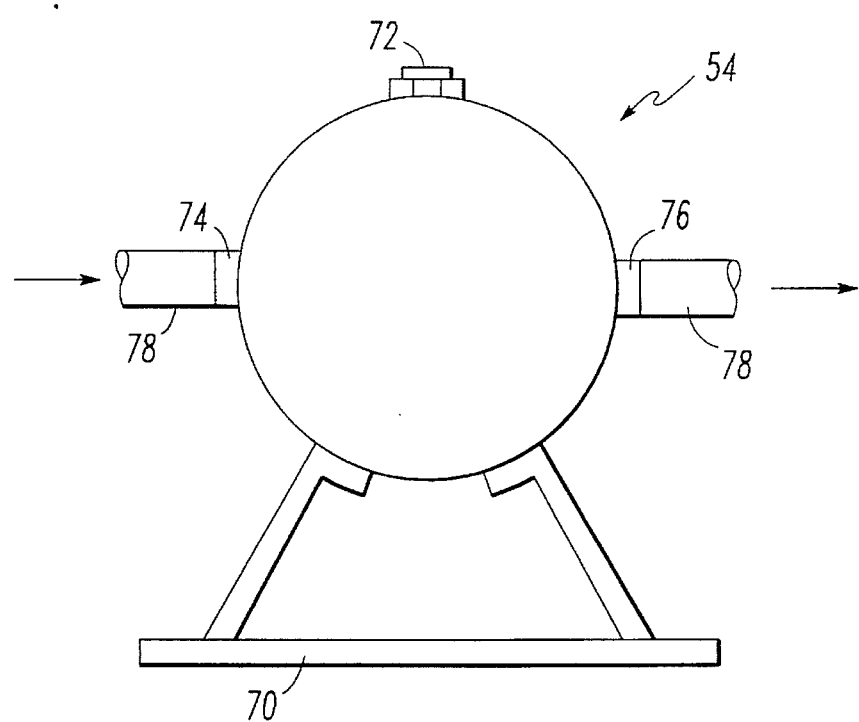
FIG. 4 is an end view of the oil pump unit of FIG. 3.
Figure 6:
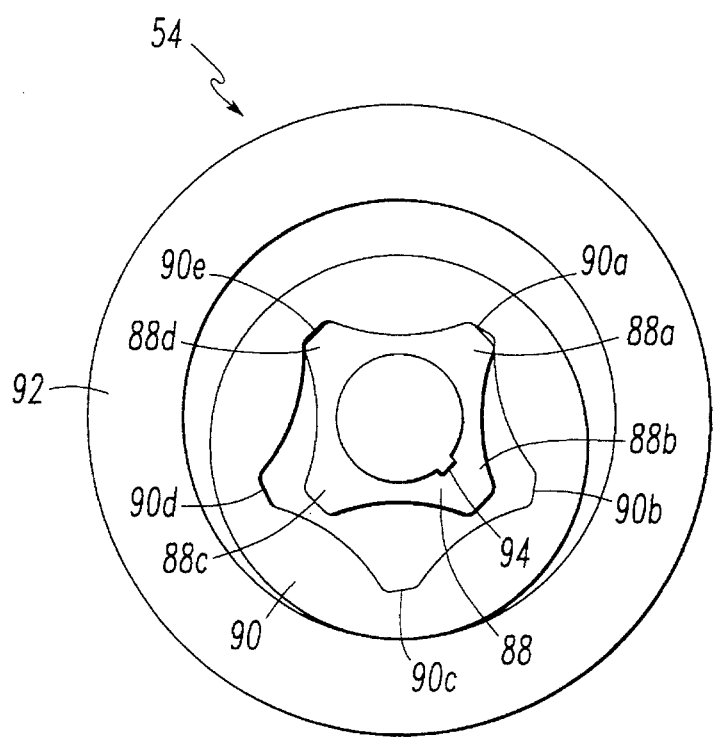
FIG. 6 is a front view of pump components of the oil pump unit of FIG. 3.

As shown in FIGS. 3, 4, and 6, the pump 54 includes a pressure relief valve 72, an inlet port 74, and an outlet port 76. As shown in FIG. 6, the pump 54 is preferably a gerotor pump that includes an inner rotor 88, an outer rotor 90, and a stator 92. Gerotor pumps, which are known in the art, typically include an inner rotor that has one less lobe than the number of indentations formed on the outer rotor. For example, inner rotor 88 includes four lobes 88a–d, while outer rotor 90 includes five indentations 90a–e. The gerotor pump preferably can achieve flow rates of at least 4 gpm and preferably has a pressure rating of at least 60 psi.

In operation, the inner rotor 88, which is mated with a drive shaft of the motor 56, rotates relative to the outer rotor 90. Additionally, the inner rotor 88 and outer rotor 90 rotate relative to the stator 92. Oil to be pumped enters a space defined by inner rotor 88 and outer rotor 90 (e.g., the space defined by lobes 88a and 88b and indentation 90b) via inlet port 74. As the space between the lobes and the indentation increases, (e.g., the space defined by lobes 88b and 88c and indentation 90c), the pump generates a suction effect to pull oil through the inlet port. As the inner rotor rotates relative to the outer rotor, the space between the lobes of the inner rotor and the indentation of the outer rotor (e.g., the space defined by lobes 88c and 88d and indentation 90d) decreases to compress the oil and force it through the coolant system via outlet port 76.

One such type of gerotor pump that can be used in accordance with the present invention is a prototype manufactured by Cascon. Alternatively, other positive displacement pumps, such as vane pumps and gear pumps, can be used.

Figure 5:
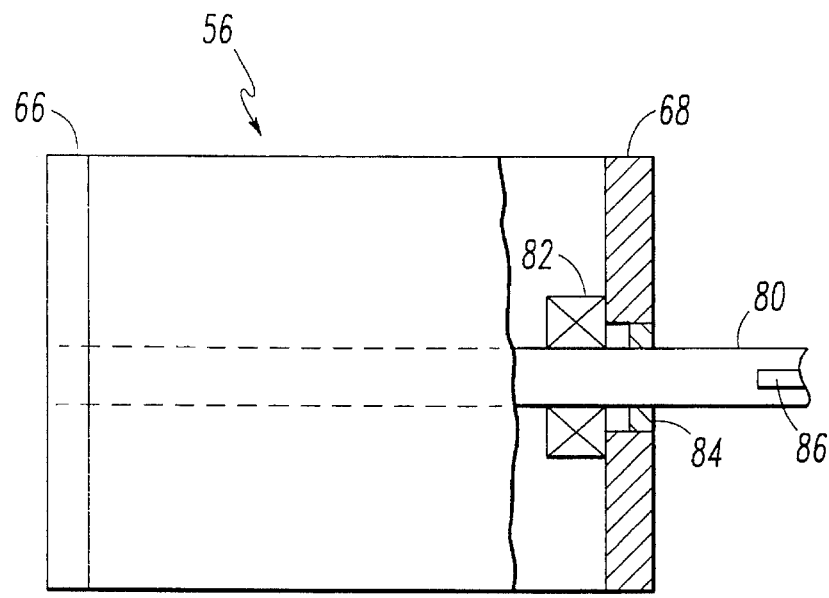
FIG. 5 is a partial cut-away side view of a motor of the oil pump unit of FIG. 3.

As shown in FIG. 5, the variable-speed ac motor 56 is preferably a brushless motor having an end cap 66, an endbell 68, a permanent magnet rotor 82, and a three-phase wound stator (not shown). The rotor position is sensed via Hall-effect sensors (not shown) located inside the motor. The motor is preferably a four-pole design rated at one-quarter horsepower at 3600 rpms and 50° C. ambient temperature. The rotor 82 is coupled to a drive shaft 80, which is supported by ball bearings (not shown) in the end cap 66, ball bearings 84 in the endbell 68, and a pilot bearing (not shown) in the pump housing.

One such motor that can be used in accordance with the present invention is a Reliance Model No. BDC-M25-EV brushless motor. Optionally, other types of variable-speed ac motors can be used, such as switched-reluctance motors and induction motors, and other such variable-speed ac motors that have no mechanical commutator.

As shown in FIGS. 5 and 6, the shaft 80 of the motor includes a key 86 which slides into a key seat 94 formed on the inner rotor 88 of the pump in order to mate the inner rotor 88 of the pump with the motor. As a result, the rotation of shaft 80 rotates inner rotor 88 and outer rotor 90 to effect a pumping action of the fluid.

The motor control unit 58 controls the speed of the motor 56 to vary the pumping action generated by the pump. The motor control unit 58 receives signals from main motor controller 18 via electrical connector 60. The motor control unit 58, which provides motor power and speed control to the ac motor 56, is attached to the end cap 66 of the motor with a gasket 62 and mounting plate 64.

The motor control unit 58 includes internal circuitry which accepts 320 volt battery power and 12 volt control power, as well as the speed control signal via electric connector 60. Rotor position sensor signals and motor power are passed between the motor and control unit via a passage in the motor end cap 66. Electrical isolation is provided for the 320 volt power, control power, and speed signal, all of which are isolated from the pump. The control unit provides a variable voltage, commutated power to the motor and maintains the pump speed commanded by the speed signal. The speed signal is a pulse-width modulated, 10 milliampere current signal which commands a pump speed in proportion to its duty cycle. The signal is isolated from the motor power circuitry via an optical coupler (not shown). Motor current limiting is provided for self-protection in the event of pump overload. The internal circuitry and function of the motor control unit is described in more detail in copending U.S. Patent Application entitled "SPEED CONTROL AND BOOTSTRAP TECHNIQUE FOR HIGH VOLTAGE MOTOR CONTROL" bearing attorney docket number 58,336, which is incorporated herein by reference.

In operation, the motor control unit 58 receives a signal from the main controller 18 and generates a signal to control the speed of the ac motor 56. Based on the control signal from the motor control unit 58, the ac motor 56 rotates the shaft 80, which in turn rotates the inner and outer rotors 88, 90 of the pump 54. The rotation of the rotors creates a pumping action which pulls oil through the inlet port 74 of the pump and out the outlet port 76 to circulate oil through the closed-loop cooling system of the electric vehicle. As shown in FIGS. 2 and 4, oil received from the oil reservoir of motor 28 enters the pump via inlet port 74 and is pumped through the outlet port 76 of the pump to the radiator/fan 36, cold plate 14, filter 30, and motor 28. Tubing 78 couples the inlet and outlet ports 74, 76 of the pump to the radiator/fan 36 and motor 28, respectively, as well as coupling the radiator/fan 36, cold plate 14, filter 30, and motor 28, as shown in FIG. 2, to form a closed-loop system. The flow rate of the oil is dependent on the control signal from the motor control unit 58 and conserves energy by only pumping oil when necessary to appropriately cool the components of the electric vehicle.

It should be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A coolant pump assembly for an electric vehicle propulsion system, comprising:

a positive displacement pump having an inlet port, an outlet port, and a rotor;

a variable-speed ac motor having a rotatable shaft mated with the rotor of the pump for rotating the rotor of the pump to circulate coolant through the inlet and outlet ports of the pump; and control means, communicating with a DC power source of the electric vehicle propulsion system, for controlling the speed of the motor to provide a variable coolant flow through the electric vehicle.

2. The assembly of claim 1, wherein the positive displacement pump is one of a gerotor pump, a vane pump, and a gear pump.

3. The assembly of claim 1, wherein the ac motor is one of a brushless motor, a switched-reluctance motor, and an induction motor.

4. The assembly of claim 1, further comprising a housing for containing the pump, the ac motor, and the control means.

5. The assembly of claim 4, further comprising mounting means for mounting the housing.

6. The assembly of claim 1, wherein the pump has a flow rate of at least 4 gpm and a pressure rating of at least 60 psi.

7. The assembly of claim 1, wherein the coolant is aircraft turbine oil.

8. A coolant pump assembly for an electric vehicle propulsion system, comprising:

a gerotor pump having an inlet port, an outlet port, and a rotor;

a variable-speed brushless motor having a rotatable shaft mated with the rotor of the pump for rotating the rotor of the pump to circulate coolant through the inlet and outlet ports of the pump; and control means, communicating with a DC power source of the electric vehicle propulsion system, for controlling the speed of the motor to provide a variable coolant flow through the electric vehicle.

9. A closed-loop cooling system for cooling components of an electric vehicle propulsion system, the system comprising:

a positive displacement pump having an inlet port, an outlet port, and a rotor;

a variable-speed ac motor having a rotatable shaft mated with the rotor of the pump for rotating the rotor of the pump to circulate coolant through the inlet and outlet ports of the pump; control means, communicating with a DC power source of the electric vehicle propulsion system, for controlling the speed of the motor to provide a variable coolant flow through the electric vehicle propulsion system;

a heat exchanger, coupled to the outlet port of the pump and the components of the electric vehicle propulsion system to be cooled, for dissipating heat transferred to the coolant by the components of the electric vehicle propulsion system; and tubing, coupling the inlet and outlet ports of the pump to the heat exchanger and the components of the electric vehicle propulsion system to be cooled, to define a closed-loop cooling system.

10. A method for circulating coolant through a cooling system to cool components of an electric vehicle propulsion system, the cooling system comprising a positive displacement pump, a variable speed ac motor having a shaft mated to a rotor of the pump for driving the pump, and a motor control unit for controlling the speed of the motor, the method comprising:

generating a signal with the motor control unit to control the speed of the variable-speed ac motor, the signal varying the speed of the motor based on a desired flow rate of the coolant;

rotating the shaft of the variable-speed ac motor based on the signal generated by the motor control unit; and circulating the coolant through the cooling system at the desired flow rate with the positive displacement pump, as the shaft of the motor rotates the rotor of the pump, to cool the components of the electric vehicle propulsion system.

11. The method of claim 10, further comprising the step of dissipating heat transferred to the coolant as the coolant cools the components of the electric vehicle propulsion system.

* * * * *